United States Patent
Deng et al.

(10) Patent No.: US 6,876,966 B1
(45) Date of Patent: Apr. 5, 2005

(54) PATTERN RECOGNITION TRAINING METHOD AND APPARATUS USING INSERTED NOISE FOLLOWED BY NOISE REDUCTION

(75) Inventors: Li Deng, Redmond, WA (US); Xuedong Huang, Woodinville, WA (US); Michael D. Plumpe, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 919 days.

(21) Appl. No.: 09/688,950

(22) Filed: Oct. 16, 2000

(51) Int. Cl.$^7$ .......................... G10L 15/06; G10L 15/20
(52) U.S. Cl. ...................... 704/233; 704/243
(58) Field of Search .......................... 704/233, 234, 704/243, 244, 251, 255, 256

(56) References Cited

U.S. PATENT DOCUMENTS

| | | | |
|---|---|---|---|
| 5,583,968 A | * 12/1996 | Trompf | 704/232 |
| 5,950,157 A | * 9/1999 | Heck et al. | 704/234 |
| 6,026,359 A | * 2/2000 | Yamaguchi et al. | 704/256 |
| 6,067,517 A | * 5/2000 | Bahl et al. | 704/256 |
| 6,691,091 B1 | * 2/2004 | Cerisara et al. | 704/255 |

OTHER PUBLICATIONS

Sameti et al., "HMM–based strategies for enhancement of speech signals embedded in nonstationary noise," IEEE Transactions on Speech and Audio Processing, vol. 6, Issue 5, Sep. 1998, pp. 445 to 455.*

Neumeyer, L. and Weintraub, M. "Probabilistic Optimum Filtering For Robust Speech Recognition," Acoustics, Speech and Signal Processing, ICASSP–94, p. 417–420, Apr. 1994.

* cited by examiner

*Primary Examiner*—Richemond Dorvil
*Assistant Examiner*—Martin Lerner
(74) *Attorney, Agent, or Firm*—Theodore M. Magee; Westman, Champlin & Kelly, P.A.

(57) ABSTRACT

A method and apparatus for training and using a pattern recognition model are provided. Under the invention, additive noise that matches noise expected in a test signal is included in a training signal. The noisy training signal is passed through one or more noise reduction techniques to produce pseudo-clean training data. The pseudo-clean training data is used to train the pattern recognition model. When the test signal is received, it is passed through the same noise reduction techniques used on the noisy training signal. This produces pseudo-clean test data, which is applied to the pattern recognition model. Under one embodiment, sets of training data are produced with each set containing a different type of noise.

29 Claims, 8 Drawing Sheets

PATTERN RECOGNITION TRAINING METHOD AND APPARATUS USING INSERTED NOISE FOLLOWED BY NOISE REDUCTION

BACKGROUND OF THE INVENTION

The present invention relates to pattern recognition. In particular, the present invention relates to training models for pattern recognition.

A pattern recognition system, such as a speech recognition system, takes an input signal and attempts to decode the signal to find a pattern represented by the signal. For example, in a speech recognition system, a speech signal (often referred to as a test signal) is received by the recognition system and is decoded to identify a string of words represented by the speech signal.

To decode the incoming test signal, most recognition systems utilize one or more models that describe the likelihood that a portion of the test signal represents a particular pattern. Examples of such models include Neural Nets, Dynamic Time Warping, segment models, and Hidden Markov Models.

Before a model can be used to decode an incoming signal, it must be trained. This is typically done by measuring input training signals generated from a known training pattern. For example, in speech recognition, a collection of speech signals is generated by speakers reading from a known text. These speech signals are then used to train the models.

In order for the models to work optimally in decoding an input test signal, the signals used to train the model should be similar to the eventual test signals that are decoded. In particular, the training signals should have the same amount and type of noise as the test signals that are decoded.

To achieve the same noise characteristics in the training signal, some prior art systems collect the training signal under the same conditions that are expected to be present when the test signal is generated. For example, speech training signals are collected in the same noisy environments where the speech recognition system will be used. Other systems collect the training data under relatively noiseless (or "clean") conditions and then add the expected noise to the clean training data.

Although adding noise to the training data or collecting training data in a noisy environment often brings the training data more in alignment with the test data, it is impossible to fully anticipate the noise that will be present in the test environment. Because of this, simply using noisy training data does not optimize the performance of the pattern recognition system.

Other prior art systems have attempted to match the training data and the testing data by applying noise reduction techniques to the testing data. In such systems, the training data is generated under substantially "clean" conditions so as to minimize its noise content. The noise reduction techniques are then applied to the testing data to bring the testing data closer to the clean condition of the training data. However, current noise reduction techniques are imperfect and cannot remove all of the noise in the test data. Because of this, the training data and the testing data remain mismatched even after the noise reduction.

Thus, the prior art techniques for matching training data noise to testing data noise are less than ideal.

SUMMARY OF THE INVENTION

A method and apparatus for training and using a pattern recognition model are provided. Under the invention, additive noise that matches noise expected in a test signal is included in a training signal. The noisy training signal is passed through one or more noise reduction techniques to produce pseudo-clean training data. The pseudo-clean training data is then used to train the pattern recognition model.

When the test signal is received, it is passed through the same noise reduction techniques used on the noisy training signal. This produces pseudo-clean test data that better matches the pseudo-clean training data. The pseudo-clean test data is then applied to the pattern recognition model to determine the most likely pattern represented by the test signal.

Under one embodiment, sets of training data are produced with each set containing a different type of noise. For example, one set may include fan noise from a computer while another set may include keyboard noise. Under such embodiments, each set of training data may be passed through the same noise reduction techniques or different sets of training data may be passed through different noise reduction techniques.

Under one embodiment, when different noise reduction techniques are used for different sets of training data, the noise in the test data is sampled to identify a particular set of training data that contains a similar type of noise. The noise reduction technique applied to the best matching training data is then applied to the test data to form the pseudo-clean test data.

In other embodiments where different noise reduction techniques are used for different sets of training data or for the same set of training data, the test data is passed through the different noise reduction techniques producing multiple different versions of pseudo-clean test data. Each of these separate forms of pseudo-clean test data is then applied to the models to determine a probability for a pattern. The proper noise reduction technique to apply to the test data is then implicitly selected by selecting the form or combination of forms of the pseudo-clean test data that produces the highest probability pattern.

DETAILED DESCRIPTION OF ILLUSTRATIVE EMBODIMENTS

Figure 1:
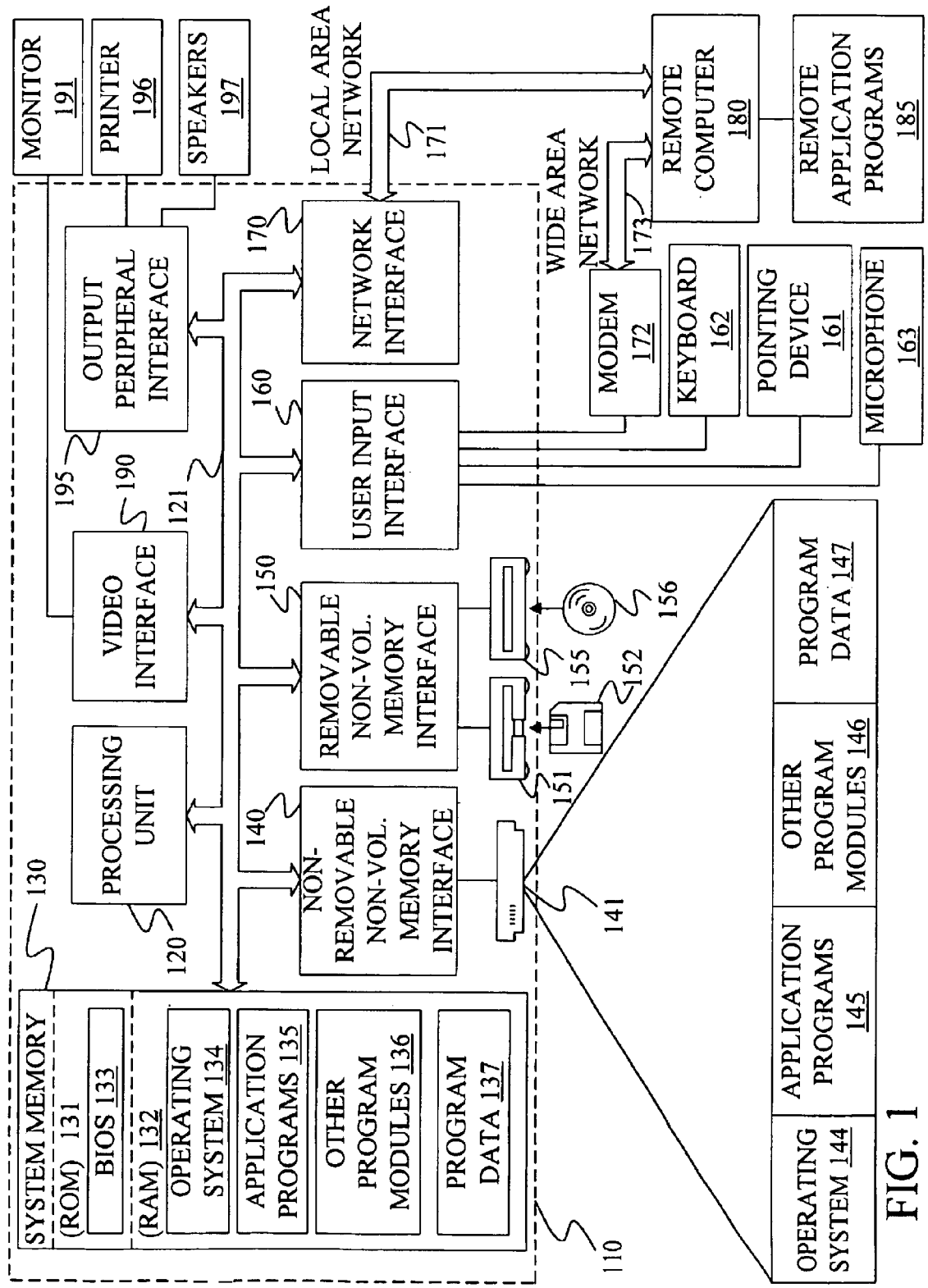
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
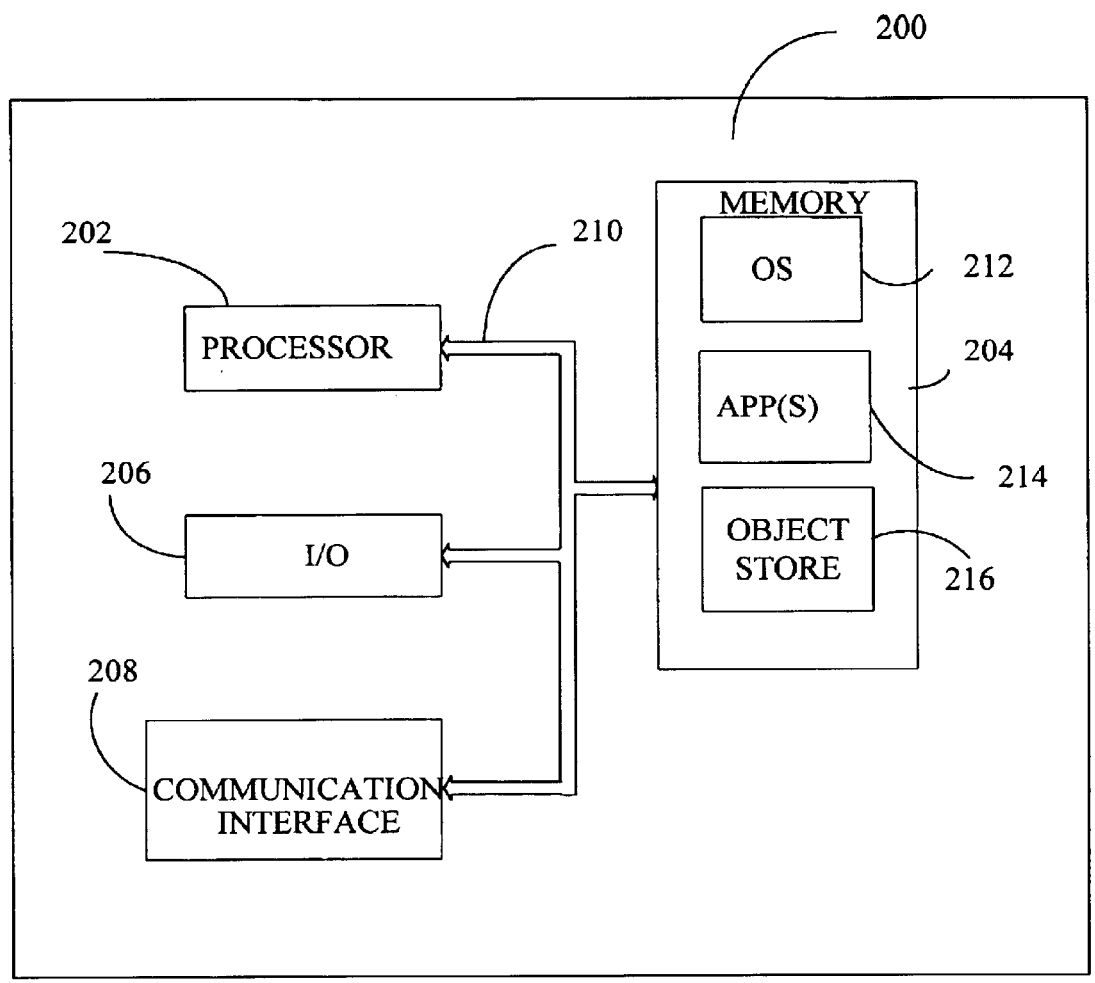
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
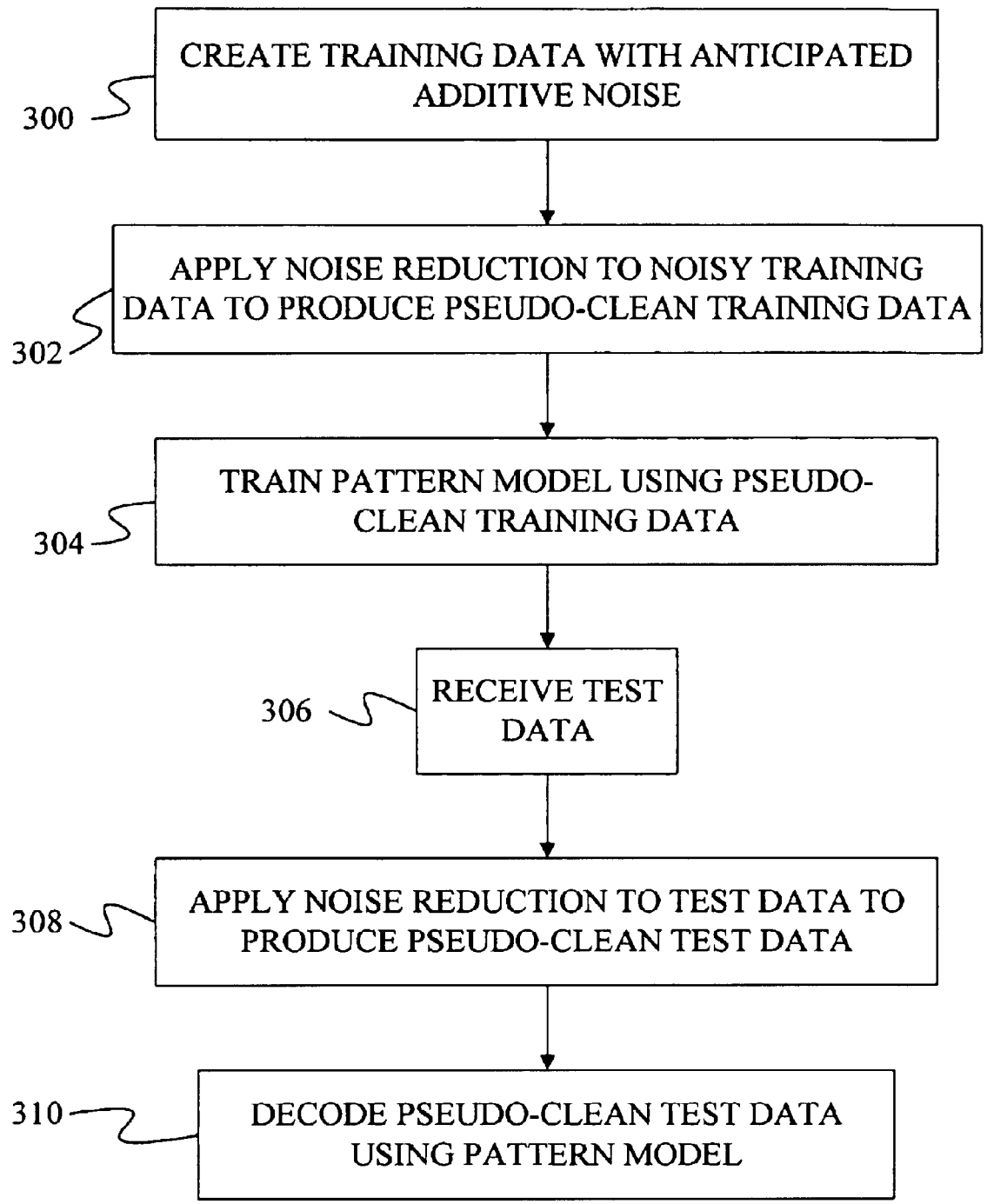
FIG. 3 is a flow diagram of one embodiment of a method of pattern recognition under the present invention.

Under the present invention, an apparatus and method are provided that improve the matching of noise between training data and test data. FIG. 3 shows one embodiment of a method for performing such matching.

In step 300 of FIG. 3, raw training data is created that includes anticipated additive noise. This anticipated additive noise is similar to the noise that is expected to be present in the test data. This anticipated additive noise can be placed in the training data by having a trainer speak in a noisy environment such as a train platform, a car, or an industrial environment. In other embodiments, the trainer speaks in a relatively noiseless environment and additive noise is then added to the "clean" training speech signals. The noise added to the clean training signal can be noise that is recorded from selected noisy environments, such as those listed above or noise that has the same statistical properties as the anticipated noise.

At step 302 of FIG. 3, the noisy training data is applied to a noise reduction module which applies one or more noise reduction techniques to the noisy training data. These noise reduction techniques can include but are not limited to Spectral Subtraction or Stereo Piecewise Linear Compensation for Environments (SPLICE). In addition, more than one noise reduction technique may be applied to the noisy data.

Because no noise reduction technique is capable of removing all noise from a signal, the output of the noise reduction module is only "pseudoclean" training data. Under this embodiment of the present invention, this pseudo-clean training data is used to train a pattern model that will later be used to detect the most likely pattern that can be represented by a given test signal. This training is shown as step 304 in FIG. 3.

The models that are trained under the present invention can include, but are not limited to, Neural Nets, Dynamic Time warping, segment models, and Hidden Markov Models.

Once the model has been trained, test data is received by the speech recognition system at step 306. The same noise reduction techniques that were applied to the noisy training data are then applied to the test data to produce pseudo-clean test data. These noise reduction techniques are applied at step 308 of FIG. 3.

By applying the same noise reduction techniques to the test data that were applied to the training data, the present invention brings the test data into a pseudo-clean state that more closely matches the pseudo-clean state of the training data.

The pseudo-clean test data is applied against the trained model at step 310 to decode the test data and determine the most likely pattern that is represented by the test data.

Figure 4:
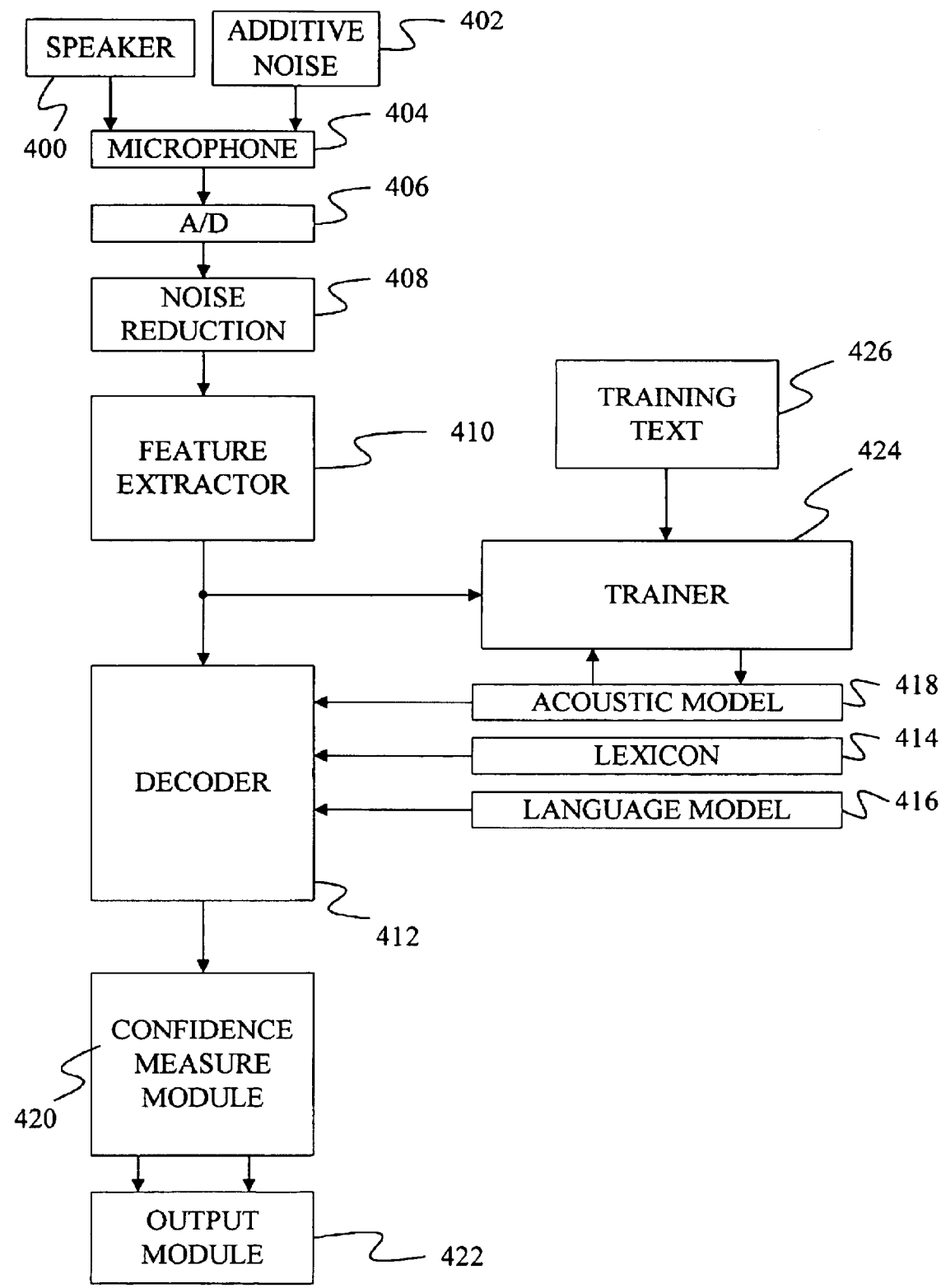
FIG. 4 is a block diagram of a pattern recognition system under one embodiment of the present invention.

FIG. 4 provides a block diagram of hardware components and program modules found in the general computing environments of FIGS. 1 and 2 that are particularly relevant to an embodiment of the present invention used for speech recognition. In FIG. 4, an input speech signal from a speaker 400 and additive noise 402 are converted into an electrical signal by a microphone 404, which is connected to an analog-to-digital (A-to-D) converter 406. Although additive noise 402 is shown entering through microphone 404 in the embodiment of FIG. 4, in other embodiments, additive noise 402 may be added to the input speech signal as a digital signal after A-to-D converter 406.

A-to-D converter 406 converts the analog signal from microphone 404 into a series of digital values. In several embodiments, A-to-D converter 406 samples the analog signal at 16 kHz and 16 bits per sample, thereby creating 32 kilobytes of speech data per second.

The digital data created by A-to-D converter 406 is provided to a noise reduction module 408, which removes some of the noise in the digital signal using one or more noise reduction techniques. Such noise reduction techniques include but are not limited to Spectral Subtraction or Stereo Piecewise Linear Compensation for Environments (SPLICE).

The output of noise reduction module 408 is provided to feature extractor 400, which extracts a feature from the digital speech signal. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module receives the stream of digital values from noise reduction module 408 and produces a stream of feature vectors that are each associated with a frame of the speech signal. In many embodiments, the centers of the frames are separated by 10 milliseconds.

Note that although noise reduction module 408 is shown before feature extractor 400 in the embodiment of FIG. 4, in other embodiments, noise reduction module 408 appears after feature extractor 400.

The stream of feature vectors produced by the extraction module is provided to a decoder 412, which identifies a most likely sequence of words based on the stream of feature vectors, a lexicon 414, a language model 416, and an acoustic model 418.

In some embodiments, acoustic model 418 is a Hidden Markov Model consisting of a set of hidden states. Each linguistic unit represented by the model consists of a subset of these states. For example, in one embodiment, each phoneme is constructed of three interconnected states. Each state has an associated set of probability distributions that in combination allow efficient computation of the likelihoods against any arbitrary sequence of input feature vectors for each sequence of linguistic units (such as words). The model also includes probabilities for transitioning between two neighboring model states as well as allowed transitions between states for particular linguistic units. By selecting the states that provide the highest combination of matching probabilities and transition probabilities for the input feature vectors, the model is able to assign linguistic units to the speech. For example, if a phoneme was constructed of states 0, 1 and 2 and if the first three frames of speech matched state 0, the next two matched state 1 and the next three matched state 2, the model would assign the phoneme to these eight frames of speech.

Note that the size of the linguistic units can be different for different embodiments of the present invention. For example, the linguistic units may be senones, phonemes, noise phones, diphones, triphones, or other possibilities.

In other embodiments, acoustic model 418 is a segment model that indicates how likely it is that a sequence of feature vectors would be produced by a segment of a particular duration. The segment model differs from the frame-based model because it uses multiple feature vectors at the same time to make a determination about the likelihood of a particular segment. Because of this, it provides a better model of large-scale transitions in the speech signal. In addition, the segment model looks at multiple durations for each segment and determines a separate probability for each duration. As such, it provides a more accurate model for segments that have longer durations. Several types of segment models may be used with the present invention including probabilistic-trajectory segmental Hidden Markov Models.

Language model 416 provides a set of likelihoods that a particular sequence of words will appear in the language of interest. In many embodiments, the language model is based on a text database such as the North American Business News (NAB), which is described in greater detail in a publication entitled CSR-III Text Language Model, University of Penn., 1994. The language model may be a context-free grammar or a statistical N-gram model such as a trigram. In one embodiment, the language model is a compact trigram model that determines the probability of a sequence of words based on the combined probabilities of three-word segments of the sequence.

Based on the acoustic model, the language model, and the lexicon, decoder 412 identifies a most likely sequence of words from all possible word sequences. The particular method used for decoding is not important to the present invention and any of several known methods for decoding may be used.

The most probable sequence of hypothesis words is provided to a confidence measure module 420. Confidence measure module 420 identifies which words are most likely to have been improperly identified by the speech recognizer, based in part on a secondary frame-based acoustic model. Confidence measure module 420 then provides the sequence of hypothesis words to an output module 422 along with identifiers indicating which words may have been improperly identified. Those skilled in the art will recognize that confidence measure module 420 is not necessary for the practice of the present invention.

Acoustic model 418 above is trained by a trainer 424 based on a training text 426 and the features extracted by feature extractor 410 from one or more training speech signals associated with training text 426. Any suitable training method that is appropriate for the particular model may be used within the scope of the present invention.

As discussed above, the training speech signals include additive noise that is partially removed by noise reduction model 408 to produce pseudo-clean data. One possible noise reduction technique that can be used under the present invention is spectral subtraction. In spectral subtraction, noise in the speech signal is sampled and the samples are converted to the frequency domain. The frequency content of the noise is then subtracted from a frequency representation of the speech signal to produce a pseudo-clean speech signal.

Figure 5:
FIG. 5 is a graph of a speech signal in the time domain.

As shown in FIG. 5, the noise can be sampled from the speech data by sampling the speech signal during pauses in the actual speech. In FIG. 5, an example of a noisy speech signal is shown with time along horizontal axis 500 and the amplitude of the speech signal shown along vertical axis 502. In FIG. 5, the speech signal includes an active speech area 504 and two pauses 506 and 508. The active speech portion 504 of the speech signal has a higher energy content than the pauses 506 and 508. By sampling the speech signal during pauses 506 and 508, the background noise can be separated from the speech content of the signal.

Figure 6:
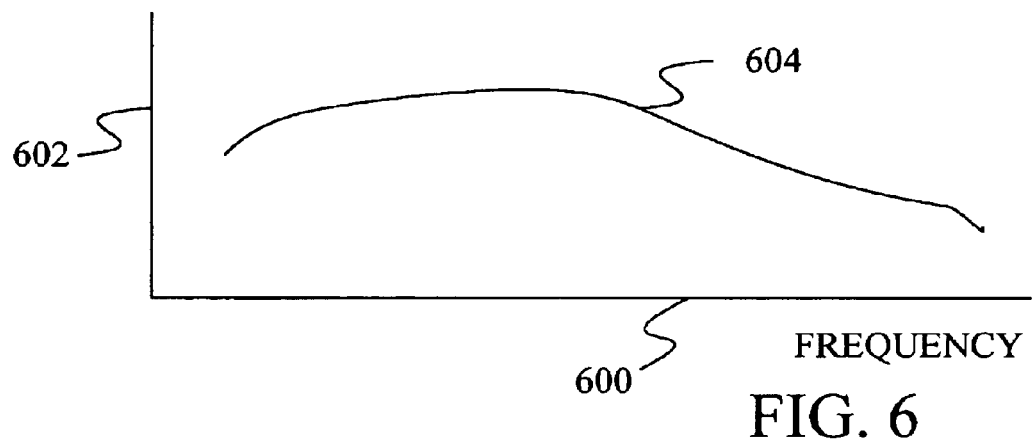
FIG. 6 is the frequency spectrum of noise in a speech signal.

FIG. 6 provides an example of the spectral content of noise samples taken during a pause in speech such as pause 506 of FIG. 5. In FIG. 6, frequency is shown along horizontal axis 600 and the amplitude of each frequency component is shown along vertical axis 602. For noise spectrum 604 of FIG. 6, the spectral content has a higher magnitude in the middle band of frequencies and a lower magnitude at the lower and higher frequencies. During spectral subtraction, this frequency signature is used to generate a noise correction value for each frequency of the speech signal. The respective correction values are then subtracted from the corresponding frequency values of the speech signal to reduce the noise in the speech signal.

Figure 7:
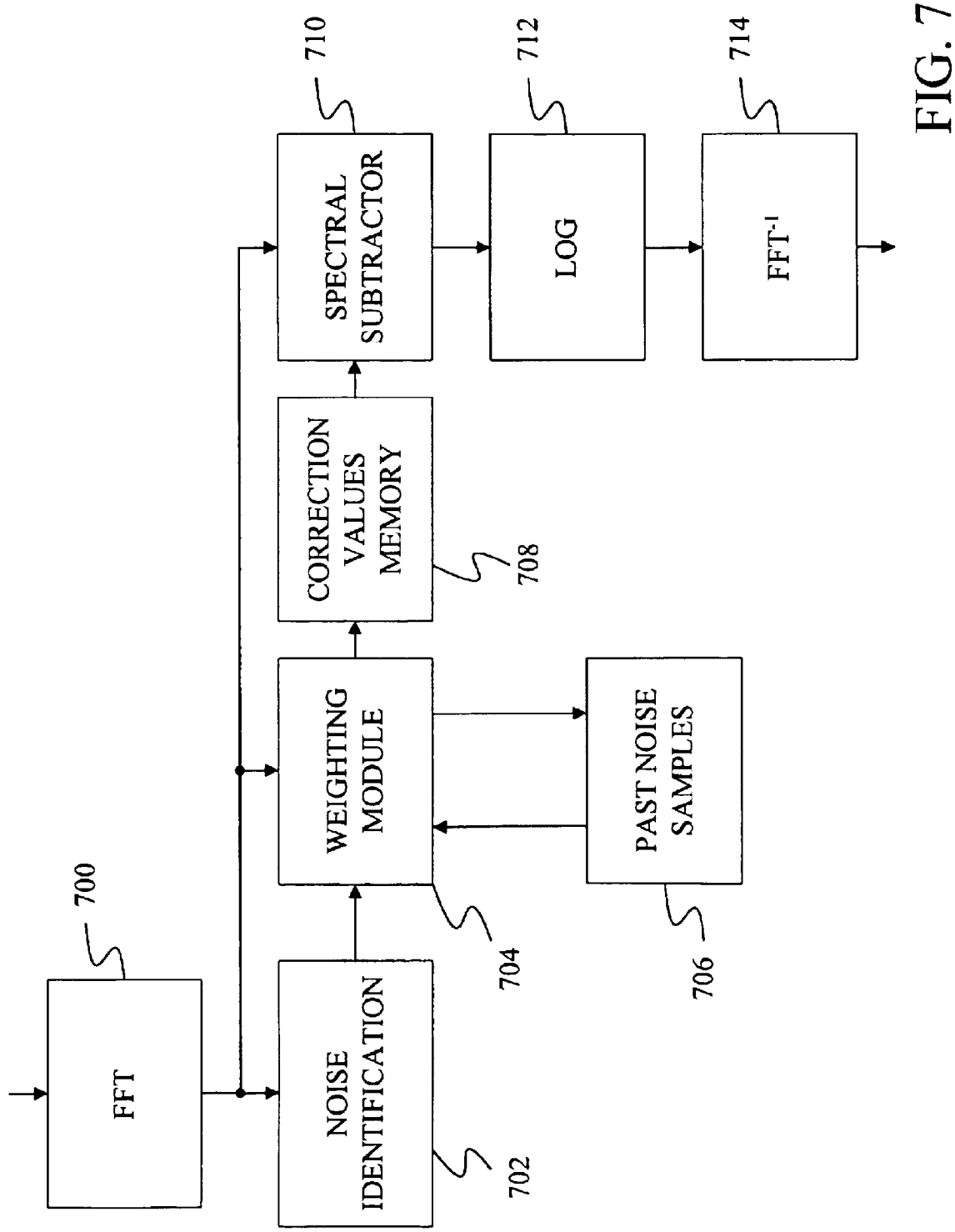
FIG. 7 is a block diagram of a noise reduction technique used in one embodiment of the present invention.

FIG. 7 provides a block diagram for one embodiment of noise reduction module 408 and feature extractor 410 of FIG. 4. In the embodiment of FIG. 7, noise reduction module 408 performs a spectral subtraction and feature extractor 410 produces Cepstral coefficients as its extracted features. In the embodiment of FIG. 7, noise reduction module 408 and feature extractor 410 are integrated together to form a single operating module. Although the functions of these two modules are integrated in FIG. 7, those skilled in the art will recognize that the individual components used to produce the embodiment of FIG. 7 need not be found on the same chip in hardware implementations of the invention or in the same software module in software implementations of the invention.

In FIG. 7, the digital values from analog-to-digital converter 406 are provided to a Fast Fourier Transform (FFT) module 700. FFT 700 converts the time-domain digital values into a series of frequency-domain values describing the frequency content of frames of the speech signal.

The frequency domain values produced by FFT 700 are provided to a noise identification module 702. Noise identification module 702 looks at the energy content of the frequency domain values of each frame to identify whether the current portion of the speech signal represents active speech or a pause in speech. Techniques for identifying pauses in speech are well known in the art.

The frequency-domain values produced by FFT 700 are also provided to a weighting module 704 that receives control values from noise identification module 702 and has access to a memory containing past noise samples 706.

When noise identification module 702 determines that the current section of speech corresponds to a pause in speech, it activates weighting module 704 to generate a new set of noise reduction values.

Under one embodiment, weighting module 704 produces the noise reduction values by combining the last "N" noise frames from the speech signal. These past "N" frames are recovered from memory 706. Under one embodiment, weighting module 704 combines the past "N" noise frames by more heavily weighting the more recent noise frames relative to the older noise frames in memory 706. As part of its processing of the new noise correction value, weighting module 704 also stores the current noise frame in memory 706.

The correction values produced by weighting module 704 are stored in a memory 708 that is accessed by a spectral subtractor 710. Spectral subtractor 710 also receives the frequency domain values from FFT 700. For each frequency associated with the correction values stored in memory 708, spectral subtractor 710 subtracts the corresponding value in memory 708 from the frequency-domain value provided by FFT 700. This results in pseudo-clean frequency domain values at the output of spectral subtractor 710.

The pseudo-clean frequency values output by spectral subtractor 710 are provided to a log module 712, which takes the log of each of the values. The log values are then provided to an inverse Fast Fourier Transform 714 which takes the inverse Fast Fourier Transform of the log values to produce a set of Cepstral coefficients for each frame of the speech signal. These sets of Cepstral coefficients represent the output of the feature extractor.

In other embodiments, the present invention uses Stereo Piecewise Linear Compensation for Environments (SPLICE) as the noise reduction technique. The SPLICE noise reduction technique is discussed in detail in a U.S. Patent Application entitled METHOD OF NOISE REDUCTION USING CORRECTION VECTORS, filed on Oct. 16, 2000, having U.S. Ser. No. 09/688,764 and hereby incorporated by reference.

Under the SPLICE technique, noise is reduced by estimating the most likely clean feature vector that could be represented by a noisy feature vector from a noisy pattern signal. This is done by selecting a correction vector to add to the noisy feature vector to form the clean feature vector. To select the correction vector, the method determines which of a set of mixture components the noisy feature vector best matches. The correction vector associated with that mixture component is then added to the noisy feature vector.

Each correction vector is formed in part by subtracting a sequence of noisy channel feature vectors from a sequence of clean channel feature vectors, where the noisy channel and the clean channel contain the same speech signal, but where the noisy channel has additive noise. Typically, the correction vectors are formed before either the training data or test data are provided to the noise reduction module.

Figure 8:
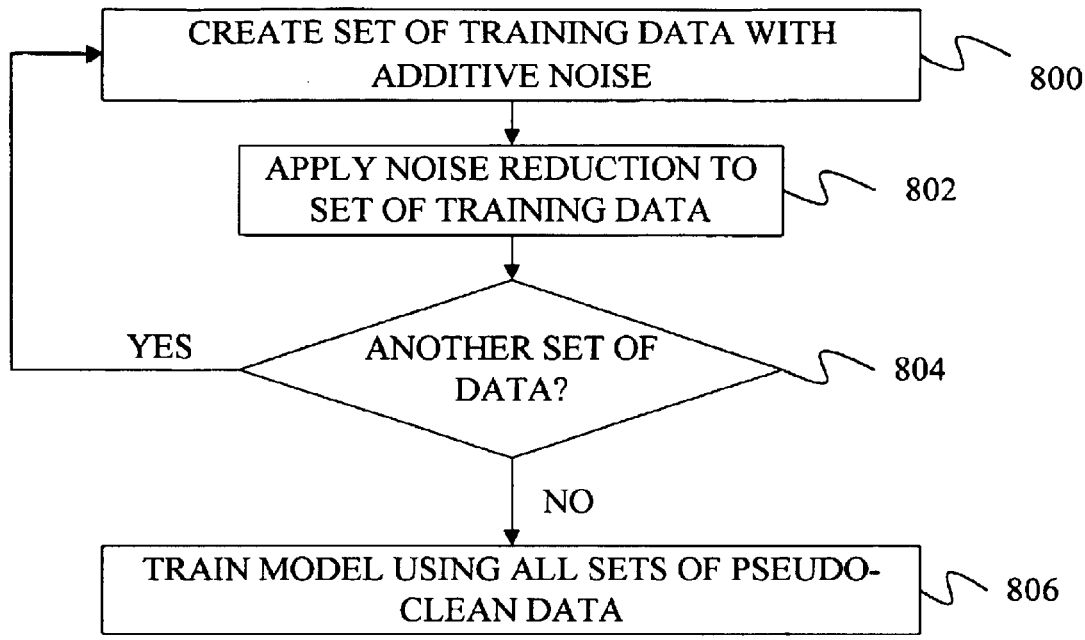
FIG. 8 is a flow diagram for training sets of training data containing different types of noise under one embodiment of the present invention.

In one embodiment of the present invention, multiple sets of training data are used to incorporate multiple types of noisy environments in the training model. Thus, under one embodiment some training data is collected at a train platform, while other data is collected in a car, and still further data is collected in an airplane. FIG. 8 provides a flow diagram of one method under the present invention for training a model using multiple sets of training data.

In step 800 of FIG. 8, one set of training data with additive noise is created, by for example having a trainer speak in a selected noisy environment. In step 802, one or more noise reduction techniques are applied to the set of training data. The noise reduction techniques applied to the training data in step 802 can be the same for each type of noisy environment or may be tailored for the specific noisy environment upon which the noise reduction techniques are being applied.

In step 804, the method determines if there is another set of training data to be collected. If there is another set, the process returns to step 800. Under one embodiment of the invention, each set of training data is associated with a different type of noise. Thus, one set may contain air-conditioning noise, and another may contain background speech noise.

If there are no other sets of data, the process continues at step 806 where the acoustic model is trained using all of the sets of pseudo-clean training data that result from the noise reduction techniques of step 802.

By using noise reduction techniques against multiple sets of training data that are each associated with different types of noise, the embodiments of the present invention produce more sharply defined models. This can be seen in FIGS. 9 through 12.

Figure 9:
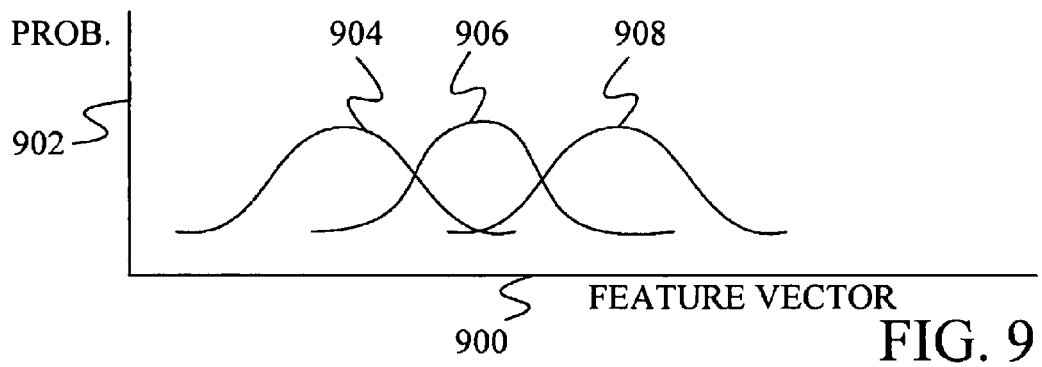
FIG. 9 is a graph of model probability distributions for different sets of training.

FIG. 9 shows three probability distributions for a unit of speech. In FIG. 9, the feature vector from the speech signal is shown along horizontal axis 900 and the probability of the speech unit is shown along vertical axis 902. Probability distributions, 904, 906 and 908 of FIG. 9 are each associated with a different set of training data. Thus, each of the probability distributions is associated with a different type of additive noise. In FIG. 9, the sets of training data have not been passed through a noise reduction module.

Figure 10:
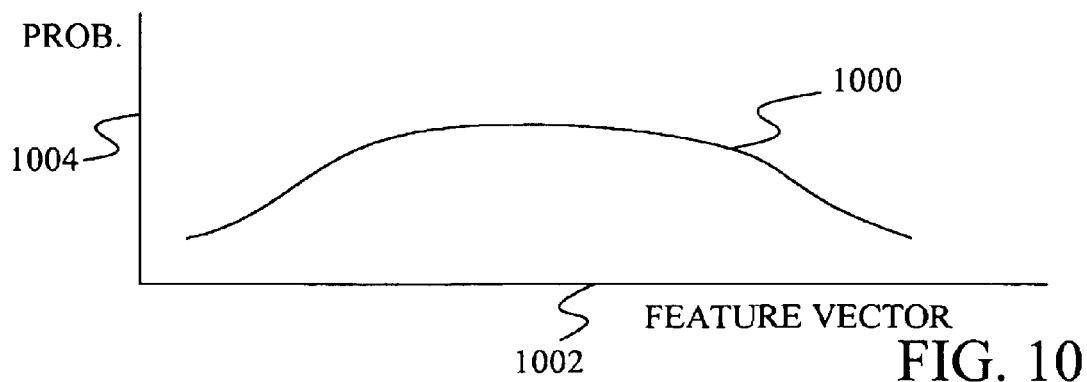
FIG. 10 is a graph of a combined model probability for the probabilities of FIG. 9.

When the probability distributions of FIG. 9 are combined to form a single model for the unit of speech, a probability distribution such as distribution 1000 of FIG. 10 is created. As in FIG. 9, the values of the feature vectors are shown along horizontal axis 1002 and the probability of the unit of speech is shown along vertical axis 1004.

Because probability distributions 904, 906 and 908 are spread out along the horizontal axis, the resulting combined probability distribution is flat. Such a distribution causes the model to be broadly defined so that the level of certainty in selecting the proper unit of speech is reduced since a given speech signal will produce similar probabilities for a large number of speech units.

Figure 11:
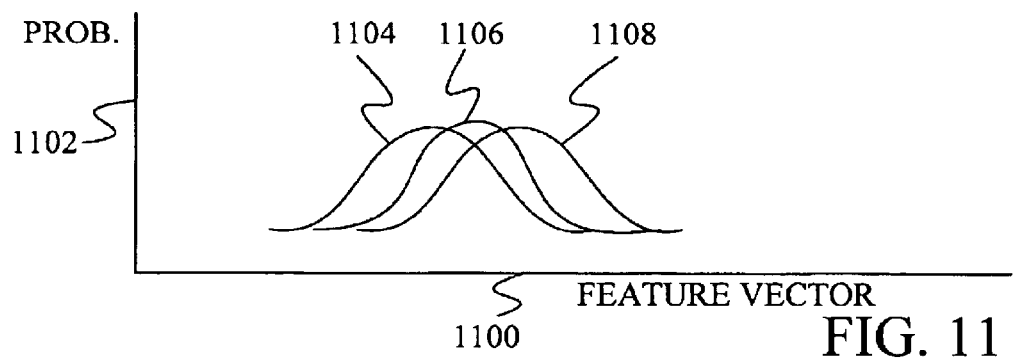
FIG. 11 is a graph of the model probability distributions of FIG. 9 after the application of noise reduction techniques of one embodiment of the present invention.

FIG. 11 shows the effects of applying noise reduction to multiple sets of training data. In FIG. 11, the feature vector values after noise reduction are shown along horizontal axis 1100 and the probability of a unit of speech is shown along vertical axis 1102. In FIG. 11, the three probability distributions of FIG. 9 have been brought closer together by the noise reduction techniques. This results in distributions 1104, 1106 and 1108 respectively.

Figure 12:
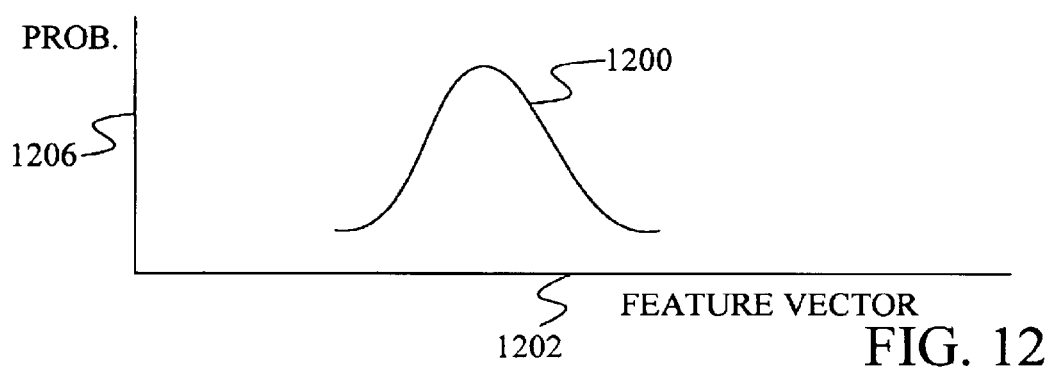
FIG. 12 is a graph of a combined model probability for the probabilities of FIG. 11.

Because the individual distributions of FIG. 11 are brought closer together, the combined distribution 1200 shown in FIG. 12 is more sharply defined. Having such sharp definition in the probability distribution results in more certainty in the decision making process for selecting a unit of speech given an input speech signal. The sharpness of the definition is shown in distribution 1200 by the fact that the distribution rises quickly near a particular feature vector along the feature vectors of horizontal axis 1202 and provides a higher probability along vertical axis 1206.

Figure 13:
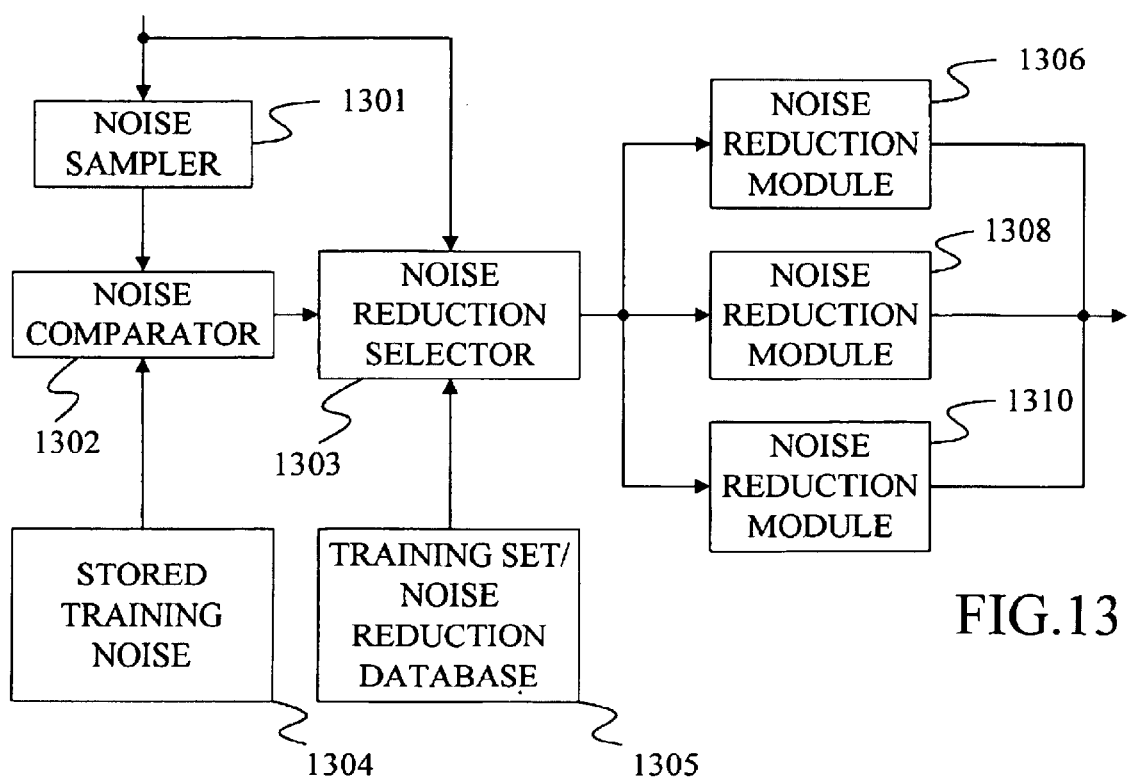
FIG. 13 provides a block diagram of a noise reduction module under an embodiment of the invention using sets of training data.

In some embodiments where different noise reduction techniques are used for different sets of training data, the noise in the test data is sampled to determine which noise reduction techniques should be applied to the test data. FIG. 13 provides a block diagram of a noise reduction module 1300 for one such embodiment of the present invention.

In noise reduction module 1300, the noise in the input test speech signal is sampled by a noise sampler 1301, by for example using the technique described above in connection with FIG. 5. The noise sample is provided to a noise comparator 1302, which compares the spectral content of the noise in the test signal to samples of training noise stored in memory 1304. Note that multiple samples of noise may be stored for each set of training data. The number of samples stored is selected by striking a balance between memory usage and the accuracy desired for the noise reduction selection process.

When it finds the best match for the noise in the test speech signal, noise comparator 1302 retrieves the set identifier for the matching signal from memory 1304.

The set identifier is provided to a noise reduction selector 1303, which retrieves the names of the noise reduction techniques that were applied to the identified set of training data. To do this, noise reduction selector 1303 accesses a training set/noise reduction database 1305, which contains a list of noise reduction techniques that were applied to each set of training data.

After it has identified the appropriate noise reduction techniques for the current sample, noise reduction selector 1303 routes the test data to the noise reduction modules associated with the identified set or cluster. In FIG. 13, this involves routing the test data to one of the noise reduction modules 1306, 1308, or 1310. Note that although noise reduction modules 1306, 1308, and 1310 are shown in parallel in FIG. 13, in other embodiments, the test data is passed through a series of noise reduction modules. The output of the selected noise reduction modules is the "pseudo-clean" test data.

In other embodiments, multiple acoustic models are trained using different sets of training data, different noise reduction techniques or combinations of both. Thus, different sets of pseudo-clean training data are generated and then used to form different respective models, instead of combining the different sets of training data into a single model as was discussed above. Under such embodiments, each noise reduction technique that is used to form the respective pseudo-clean training data is also applied to the test data. This creates a plurality of sets of pseudo-clean test data, with one set for each respective model. Each set of pseudo-clean test data is then applied against its respective model to find a probability for the model/test data pair.

The decoder then examines all of the probabilities and selects the model/test data pair that provides the highest probability. This selection can be made based on the probability across the entire speech signal such that one model and one respective set of noise reduction techniques is applied across the entire speech signal or the selection can be made based on a probability for a segment of speech such that different segments use different models and noise reduction techniques. For example, a first phoneme may be decoded using one model/test data pair while a neighboring phoneme is decoded using a second model/test data pair. Using such a technique allows the decoder to inherently select the best noise reduction technique and model to apply to each segment of test data.

In still further embodiments, different sets of pseudo-clean training data are formed using different noise reduction techniques but only one model is constructed. The different noise reduction techniques are then applied to the test data to form multiple sets of pseudo-clean test data.

Each different set of pseudo-clean test data is applied against the model and the decoder selects the pseudo-clean test data that generates the highest probability. This selection can be made based on a probability across the entire speech signal or it can be made based on a probability for a segment of the speech signal.

Although the present invention has been described with reference to particular embodiments, workers skilled in the art will recognize that changes may be made in form and detail without departing from the spirit and scope of the invention.

What is claimed is:

1. A method of generating a pattern recognition model, the method comprising:

introducing additive noise into a training signal, the additive noise being noise that is similar to noise that is anticipated to be present in a test signal during pattern recognition applying at least one noise reduction technique to the training signal to produce pseudo-clean training data; and constructing an acoustic model of the pattern recognition model based on the pseudo-clean training data.

2. The method of claim 1 wherein applying at least one noise reduction technique comprises applying a plurality of noise reduction techniques.

3. The method of claim 1 wherein introducing additive noise into the training signal comprises introducing different types of noise to generate different sets of noisy training data, each set of noisy training data being associated with a different type of noise.

4. The method of claim 3 wherein applying at least one noise reduction technique comprises applying the same noise reduction technique to all of the sets of noisy training data.

5. The method of claim 3 wherein applying at least one noise reduction technique comprises applying at least one noise reduction technique to one set of noisy training data that is not applied to any of the other sets of noisy training data.

6. The method of claim 5 further comprising a method of using the generated pattern recognition model to recognize a pattern, the method of using comprising:

receiving a test signal;

sampling noise in the test signal;

comparing the sampled noise from the test signal to noise sampled from the sets of noisy training data;

identifying the set of noisy training data that has noise that most closely matches the noise sampled from the test signal;

applying the noise reduction technique that was applied to the identified set of noisy training data to the test signal to produce pseudo-clean test data; and applying the pseudo-clean test data to a pattern recognition model to identify a pattern in the test signal.

7. The method of claim 5 further comprising a method of using the generated pattern recognition model to recognize a pattern, the method of using comprising:

receiving a test signal;

creating at least two sets of pseudo-clean test data by applying at least two different noise reduction techniques to the test signal; and applying each set of pseudo-clean test data to a pattern recognition model to identify a pattern in the test signal.

8. The method of claim 7 wherein applying at least one noise reduction technique to the training signal produces at least two sets of pseudo-clean training data and constructing the pattern recognition model comprises constructing a separate pattern recognition model for each set of pseudo-clean training data.

9. The method of claim 8 wherein the method of using the generated pattern recognition model further comprises:

applying each set of pseudo-clean test data to a separate pattern recognition model to identify a separate probability; and selecting a probability from at least two separate probabilities to identify a pattern in the test signal.

10. The method of claim 1 further comprising a method of using the generated pattern recognition model to recognize a pattern, the method of using comprising:

receiving a test signal;

applying the at least one noise reduction technique to the test signal to produce pseudo-clean test data; and applying the pseudo-clean test data to the pattern recognition model to identify a pattern in the test signal.

11. A pattern recognition model having acoustic model parameters consistent with a model that has been trained through a process comprising:

identifying a type of noise that is expected to be present in a test signal from which a pattern is to be recognized;

generating a training signal such that the training signal contains the identified type of noise;

reducing the noise in the training signal to produce training data; and generating the acoustic model parameters based on the training data.

12. The pattern recognition model of claim 11 wherein generating a training signal comprises recording the training signal in a noisy environment that is similar to a noisy environment in which the test signal is expected to be generated.

13. The pattern recognition model of claim 11 where generating a training signal comprises recording a clean training signal in a clean environment and adding the identified type of noise to the clean training signal.

14. The pattern recognition model of claim 11 wherein identifying a type of noise comprises identifying multiple types of noise and wherein generating a training signal comprises generating multiple sets of training signals where each set contains a different type of identified noise.

15. The pattern recognition model of claim 14 wherein reducing the noise comprises applying the same noise reduction technique to each set of training signals.

16. The pattern recognition model of claim 14 wherein reducing the noise comprises applying different respective noise reduction techniques to the different sets of training signals.

17. A pattern recognition system for recognizing patterns in a test signal, the recognition system comprising:

a pattern recognition model having model parameters formed through a process comprising:

generating a training signal such that the training signal includes a type of noise that is anticipated to be present in the test signal;

reducing the noise in the training signal using a noise reduction technique to produce cleaned training values; and using the cleaned training values to form the model parameters;

a noise reduction module being receptive of the test signal and being capable of applying the noise reduction technique to the test signal to produce cleaned test values; and a decoder, receptive of features of the cleaned test values and capable of accessing the pattern recognition model to identify patterns in the test signal based on the cleaned test values.

18. The pattern recognition system of claim 17 wherein generating a training signal comprises generating sets of training signals with each training signal set including a different type of noise.

19. The pattern recognition system of claim 18 wherein reducing the noise in the training signal comprises reducing the noise in each of the sets of training signals by applying the same noise reduction technique to each set of training signals.

20. The pattern recognition system of claim 18 wherein reducing the noise in the training signal comprises reducing the noise in each of the sets of training signals by applying a different respective noise reduction technique to each set of training signals.

21. The pattern recognition system of claim 20 wherein the noise reduction module further comprises:

a noise sampler that samples noise in the test signal;

a noise comparator that compares the noise sampled from the test signal to the noise in the sets of training signals and identifies a set of training signals that includes noise that best matches the noise sampled in the test signal; and a noise reduction selector that selects and applies to the test signal a noise reduction technique applied to the identified set of training signals.

22. The pattern recognition system of claim 17 further comprising:

a second pattern recognition model having second model parameters formed through a process comprising:

generating a second training signal such that the second training signal includes a second type of noise that is anticipated to be present in the test signal;

reducing the noise in the second training signal using a noise reduction technique to produce cleaned training values; and using the cleaned training values to form the second model parameters.

23. The pattern recognition system of claim 22 wherein the decoder identifies patterns in the test signal by applying the features of the cleaned test values to the pattern recognition model and the second pattern recognition model.

24. The pattern recognition system of claim 23 wherein reducing the noise in the second training signal comprises using the same noise reduction technique that was used to reduce the noise in the training signal.

25. The pattern recognition system of claim 23 wherein reducing the noise in the second training signal comprises using a different noise reduction technique than the one that was used to reduce the noise in the training signal.

26. The pattern recognition system of claim 23 wherein the decoder identifies a pattern by selecting between a pattern identified using the pattern recognition model and a pattern identified using the second pattern recognition model.

27. The pattern recognition system of claim 26 wherein the pattern recognition system is a speech recognition system and wherein the decoder selects between a string of words identified using the pattern recognition model and a string of words identified using the second pattern recognition model.

28. The pattern recognition system of claim 26 wherein the pattern recognition system is a speech recognition system and wherein the decoder selects between a word identified using the pattern recognition model and a word identified using the second pattern recognition model.

29. The pattern recognition system of claim 26 wherein the pattern recognition system is a speech recognition system and wherein the decoder selects between a sub-word acoustic unit identified using the pattern recognition model and a sub-word acoustic unit identified using the second pattern recognition model.

* * * * *